US012463331B2

(12) United States Patent
Ban et al.

(10) Patent No.: US 12,463,331 B2
(45) Date of Patent: Nov. 4, 2025

(54) ANTENNA ASSEMBLY, ANTENNA SYSTEM, AND VEHICLE

(71) Applicant: FUYAO GLASS INDUSTRY GROUP CO., LTD., Fujian (CN)

(72) Inventors: Tao Ban, Fujian (CN); Chengwei Pan, Fujian (CN); Mengyin Dong, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 234 days.

(21) Appl. No.: 18/227,597

(22) Filed: Jul. 28, 2023

(65) Prior Publication Data

US 2023/0402743 A1 Dec. 14, 2023

Related U.S. Application Data

(63) Continuation of application No. PCT/CN2022/075382, filed on Feb. 7, 2022.

(30) Foreign Application Priority Data

Feb. 9, 2021 (CN) ........................ 202110174937.0

(51) Int. Cl.
*H01Q 1/32* (2006.01)

(52) U.S. Cl.
CPC ......... *H01Q 1/3275* (2013.01); *H01Q 1/3233* (2013.01)

(58) Field of Classification Search
CPC ...... H01Q 1/3275; H01Q 1/3233; H01Q 1/38; H01Q 9/0457; H01Q 21/28; H01Q 1/22;
(Continued)

(56) References Cited

U.S. PATENT DOCUMENTS 4,240,516 A * 12/1980 Henderson ......... G07C 9/00722 180/289
5,650,791 A * 7/1997 Talty .................... H01Q 1/1271 343/744

(Continued)

FOREIGN PATENT DOCUMENTS

CN 205488501 U 8/2016
CN 106169642 A 11/2016

(Continued)

OTHER PUBLICATIONS

Extended European search report dated Jun. 14, 2024 received in European Patent Application No. 22752221.6.

(Continued)

*Primary Examiner* — Dameon E Levi
*Assistant Examiner* — Jordan E. DeWitt
(74) *Attorney, Agent, or Firm* — Scully, Scott, Murphy & Presser, P.C.

(57) ABSTRACT

An antenna assembly, an antenna system, and a vehicle are provided in the disclosure. The antenna assembly includes a sunroof and an antenna combination. The antenna combination is disposed at an end of the sunroof. The antenna combination includes multiple antenna elements arranged along an edge of the sunroof. When the antenna assembly provided in the disclosure is applied to a vehicle, exterior design of the vehicle may not be adversely affected.

20 Claims, 9 Drawing Sheets

(58) Field of Classification Search
CPC .. H01Q 1/36; H01Q 1/48; H01Q 1/50; H01Q 21/00; H01Q 21/0006
See application file for complete search history.

(56) References Cited

U.S. PATENT DOCUMENTS

| | | | | | |
|---|---|---|---|---|---|
| 5,949,381 | A * | 9/1999 | Saitoh | H01Q 1/1271 343/713 | |
| 10,721,795 | B2 | 7/2020 | Noda et al. | | |
| 2005/0195114 | A1* | 9/2005 | Yegin | H01Q 1/325 343/713 | |
| 2008/0007459 | A1* | 1/2008 | Koskiniemi | H01Q 21/28 343/700 MS | |
| 2011/0298678 | A1* | 12/2011 | Petrucci | H01Q 1/3275 343/713 | |
| 2012/0038526 | A1* | 2/2012 | Lim | H01Q 9/0407 343/700 MS | |
| 2012/0098717 | A1* | 4/2012 | Petrucci | H01Q 1/3275 343/713 | |
| 2012/0218154 | A1 | 8/2012 | White et al. | | |
| 2013/0136196 | A1* | 5/2013 | Rousu | H04B 1/3822 375/259 | |
| 2013/0249748 | A1* | 9/2013 | Togura | H01Q 9/26 343/713 | |
| 2016/0134008 | A1* | 5/2016 | Kim | H01Q 21/28 343/711 | |
| 2017/0324140 | A1* | 11/2017 | Talty | H01Q 1/1271 | |
| 2018/0037006 | A1* | 2/2018 | Droste | H01Q 9/0407 | |
| 2020/0243942 | A1* | 7/2020 | Fuchs | H01Q 1/48 | |
| 2020/0373673 | A1* | 11/2020 | Hashemi | H01Q 21/0087 | |
| 2022/0197080 | A1* | 6/2022 | Huh | H01Q 9/045 | |
| 2023/0055236 | A1* | 2/2023 | Odes | H01Q 9/40 | |
| 2023/0387566 | A1* | 11/2023 | Zhao | H01Q 1/325 | |
| 2023/0402743 | A1* | 12/2023 | Ban | H01Q 9/0457 | |
| 2024/0030593 | A1* | 1/2024 | Pan | H01Q 1/3275 | |
| 2024/0162613 | A1* | 5/2024 | Tang | H01Q 3/34 | |

FOREIGN PATENT DOCUMENTS

| | | | | | |
|---|---|---|---|---|---|
| CN | 207052742 | U | | 2/2018 | |
| CN | 209103780 | U | * | 7/2019 | |
| CN | 209126665 | U | | 7/2019 | |
| CN | 210723340 | U | | 6/2020 | |
| CN | 211789528 | U | | 10/2020 | |
| CN | 112072293 | A | | 12/2020 | |
| DE | 102016219167 | A1 | * | 4/2018 | |
| DE | 102016220238 | A1 | * | 4/2018 | H01Q 21/28 |
| DE | 102016220238 | B4 | * | 11/2023 | H01Q 21/28 |
| JP | 2002353721 | A | | 12/2002 | |
| JP | 2003523119 | A | | 7/2003 | |
| JP | 2009274608 | A | | 11/2009 | |
| JP | 2019068281 | A | | 4/2019 | |
| WO | 2020218115 | A1 | | 10/2020 | |

OTHER PUBLICATIONS

Notice of Reasons for Refusal dated Aug. 29, 2024 received in Japanese Patent Application No. 2023-547466.

International Search Report dated Mar. 29, 2022 issued in PCT/CN2022/075382.

CN First Office Action dated Sep. 30, 2021 issued in CN 202110174937.0.

CN Second Office Action dated Feb. 22, 2022 issued in CN 202110174937.0.

* cited by examiner

ANTENNA ASSEMBLY, ANTENNA SYSTEM, AND VEHICLE

CROSS-REFERENCE TO RELATED APPLICATION(S)

The application is a continuation of International Application No. PCT/CN2022/075382, filed Feb. 7, 2022, which claims priority to Chinese Patent Application No. 202110174937.0, filed Feb. 9, 2021, the entire disclosures of which are incorporated herein by reference.

TECHNICAL FIELD

This disclosure relates to the field of antenna technology, and in particular, to an antenna assembly, an antenna system, and a vehicle.

BACKGROUND

In recent years, with the development of technology, there are more and more antennas mounted to vehicles. An existing antenna assembly is generally mounted in a shark fin, and the shark fin may integrate multiple antennas and be mounted on the roof of the vehicle. However, external antennas disposed on the outside of the vehicle affects exterior design of the vehicle, and if design of external antennas is unreasonable, an air resistance to the vehicle may increase.

SUMMARY

An antenna assembly, an antenna system, and a vehicle are provided in the disclosure. When the antenna assembly is applied to the vehicle, exterior design of the vehicle may not be affected.

In a first aspect, an antenna assembly applicable to a vehicle is provided in the disclosure. The antenna assembly includes a sunroof and an antenna combination. The antenna combination is disposed at an end of the sunroof. The antenna combination includes multiple antenna elements arranged along an edge of the sunroof.

The multiple antenna elements include a first antenna element. The first antenna element is a navigation antenna element and includes a first radiator disposed at a central axis of the sunroof.

The multiple antenna elements further include a second antenna element. The second antenna element includes multiple second radiators arranged along the edge of the sunroof.

The multiple antenna elements further include a third antenna element. The third antenna element includes multiple third radiators arranged along the edge of the sunroof.

The multiple antenna elements include radiators and first cables. The sunroof includes an inner layer, an intermediate layer, and an outer layer that are stacked in sequence. The radiators are disposed between the inner layer and the outer layer, and the first cables are disposed at a side of the inner layer away from the radiators.

The multiple antenna elements further include a ground layer disposed at a side of the inner layer away from the outer layer. The ground layer defines a gap thereon. Orthographic projections of the first cables on the ground layer at least partially fall within the gap. The first cables are coupled to and configured to feed the radiators through the gap on the ground layer.

The multiple antenna elements include radiators, a ground layer, and first cables. The radiators and the ground layer are disposed at a same side of the sunroof, and the first cables are directly connected to and configured to feed the radiators.

The antenna assembly further includes a fixing member. The multiple antenna elements include radiators and first cables. The first cables are electrically connected to the radiators, and the first cables are fixed on the sunroof through the fixing member.

The first cables are implemented as multiple first cables, and the multiple first cables are arranged at intervals along the edge of the sunroof.

In a second aspect, an antenna system is further provided in the disclosure. The antenna system includes an on-board unit (OBU) and the antenna assembly above. The first cables of the antenna assembly are electrically connected to the OBU.

In a third aspect, a vehicle is further provided in the disclosure. The vehicle includes a vehicle body and the antenna system above. The antenna system is mounted on the vehicle body, and the OBU of the antenna system is electrically connected to the vehicle body through a second cable.

The antenna assembly provided in the disclosure can bring the following technical effects. On the one hand, the antenna combination is disposed on the sunroof, so that adverse effect on exterior design of the vehicle can be avoided, and an air resistance may not be increased. On the other hand, the antenna combination is disposed at the edge of the sunroof, which can avoid or weaken light blocking by the antenna combination, thereby ensuring that sufficient light can pass through the sunroof and then irradiate the interior of the vehicle, so as to obtain better daylighting effect. On the other hand, the multiple antenna elements are arranged along the edge of the sunroof, so that a length direction of the OBU can be designed to be parallel to a direction in which the multiple antenna elements are arranged. Under such arrangement, a connection area between the OBU and the vehicle body can be increased, thereby improving connection stability and facilitating arrangement of the first cables between the OBU and the multiple antenna elements.

BRIEF DESCRIPTION OF THE DRAWINGS

To describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skills in the art can also obtain other drawings without creative effort.

Illustration of reference signs: vehicle—1, vehicle body—2, antenna system—3, second cable—4, on-board element—5, antenna assembly—6, sunroof—10, antenna combination—20, power-supply line—41, communication line—42, inner layer—110, intermediate layer—120, outer layer—130, first region—A1, second region—A2, antenna element—200, first antenna element—210, second antenna element—220, third antenna element—230, radiator—240, first cable—250, ground layer—260, fixing member—270, first radiator—211, second radiator—221, third radiator—231, insulation sleeve—251, core—252, gap—C1.

DETAILED DESCRIPTION

The following will illustrate clearly and completely technical solutions of implementations of the disclosure with reference to accompanying drawings of implementations of the disclosure. Apparently, implementations illustrated herein are merely some, rather than all, of the disclosure. Based on the implementations of the disclosure, all other implementations obtained by those of ordinary skill in the art without creative effort shall fall within the protection scope of the disclosure.

The terms “first”, “second”, and the like used in the specification, the claims, and the accompany drawings of the disclosure are used to distinguish different objects rather than describe a particular order. The terms “include”, “comprise”, and “have” as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term “implementation” referred to herein means that a particular feature, structure, or characteristic illustrated in conjunction with implementations may be contained in at least one implementation of the disclosure. The phrase appearing in various places in the specification does not necessarily refer to a same implementation, nor does it refer to an independent implementation that is mutually exclusive with other implementations or an alternative implementation. It is explicitly and implicitly understood by those skilled in the art that implementations illustrated herein may be combined with other implementations without contradiction in combination of at least two implementations.

Figure 1:
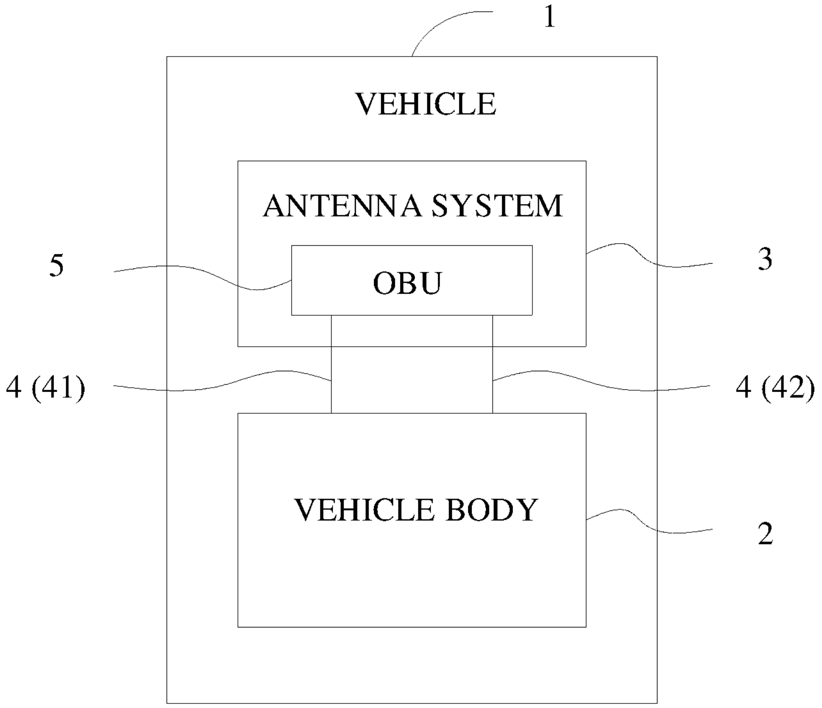
FIG. 1 is a schematic view illustrating connection between an antenna system and a vehicle body provided in an implementation of the disclosure.
Figure 2:
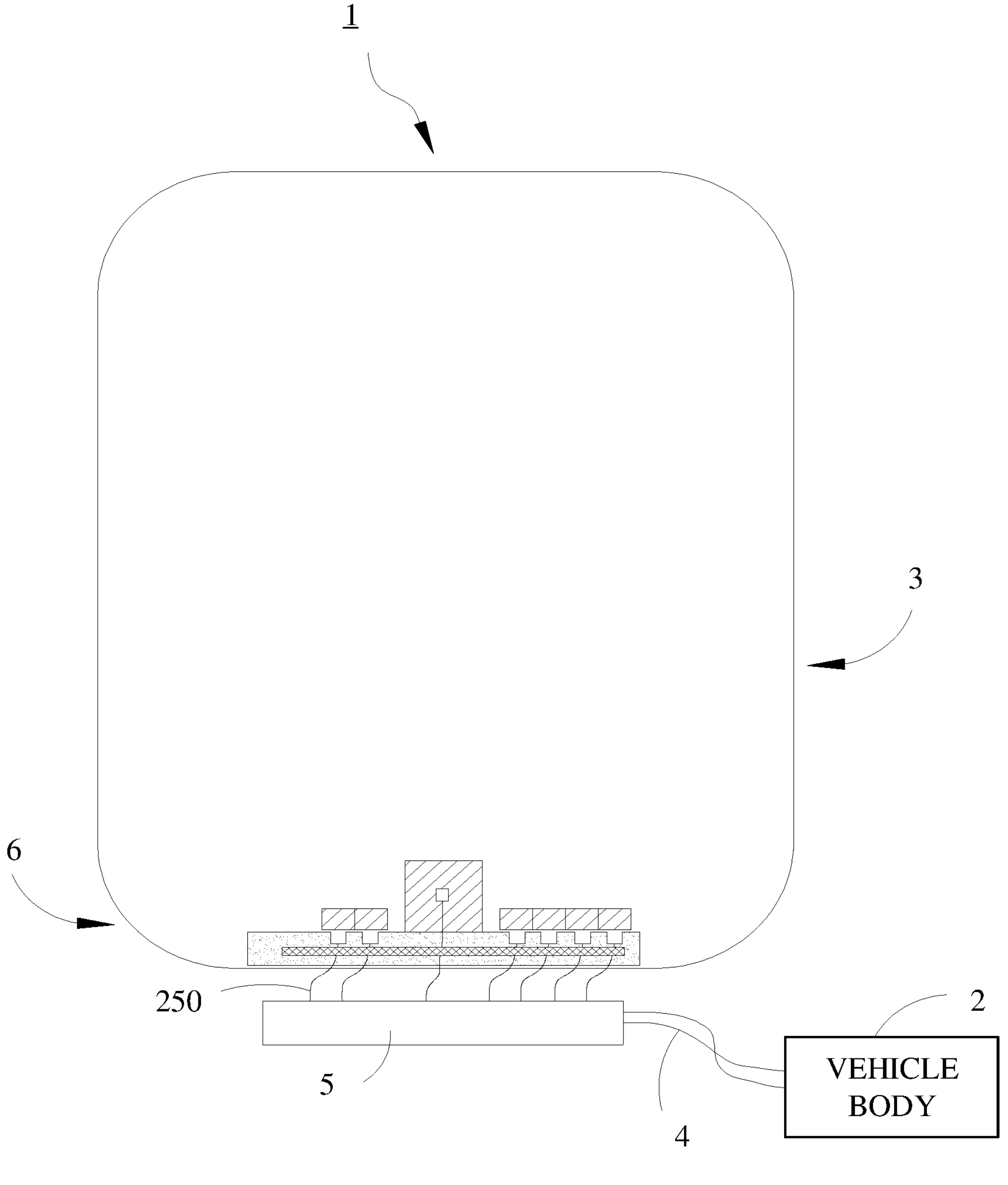
FIG. 2 is a schematic view illustrating connection between an antenna system and a vehicle body provided in another implementation of the disclosure.

Referring to FIG. 1 and FIG. 2, a vehicle 1 is provided in the disclosure. The vehicle 1 may be, but is not limited to, a sedan, a multi-purpose vehicle (MPV), a sports/suburban utility vehicle (SUV), an off-road vehicle (ORV), a pickup, a minibus, a passenger vehicle, a cargo vehicle, and the like.

The vehicle 1 includes a vehicle body 2 and an antenna system 3 that will be described in the following implementations. The antenna system 3 is mounted on the vehicle body 2, and an on-board unit (OBU) 5 of the antenna system 3 is electrically connected to the vehicle body 2 through a second cable 4.

The vehicle body 2 refers to at least part of the vehicle 1, or the vehicle body 2 may include at least part of structural members and electronic components of the vehicle 1. For example, the vehicle body 2 may include a frame, a windshield, a seat, a central control screen, and the like.

The antenna system 3 is configured to transmit/receive (i.e., transmit and/or receive) an electromagnetic wave. The OBU 5 of the antenna system 3 is electrically connected to the vehicle body 2 via the second cable 4 (a power-supply line 41 and a communication line 42). In other words, the OBU 5 is connected to a vehicle network via the second cable 4 for communication, and the vehicle 1 is communicated with the outside via the antenna system 3.

Figure 3:
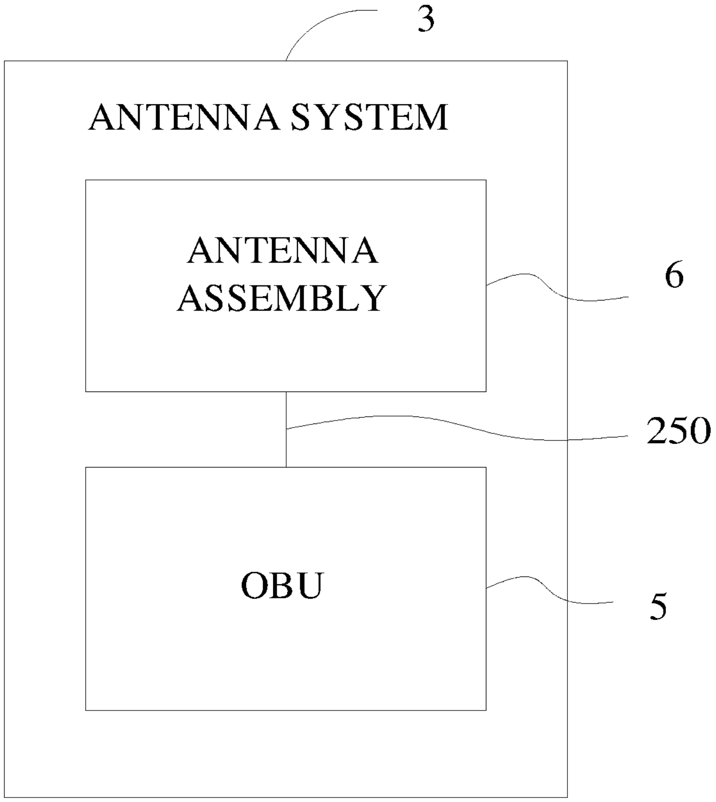
FIG. 3 is a schematic view illustrating connection between an antenna assembly and an on-board unit (OBU) provided in implementations of the disclosure.

Furthermore, referring to FIG. 2 and FIG. 3, the antenna system 3 is further provided in the disclosure. The antenna system 3 includes the OBU 5 and an antenna assembly 6 described in any one of the following implementations. A first cable 250 of the antenna assembly 6 is electrically connected to the OBU 5. The OBU 5 may be disposed at a component such as the windshield, the frame, or a ceiling of the vehicle 1, which is not limited herein.

The OBU 5 is configured to generate a radio-frequency (RF) signal. The RF signal may be transmitted to the antenna assembly 6 through the first cable 250 to excite the antenna assembly 6 to generate a corresponding electromagnetic wave and radiate the electromagnetic wave to a surrounding space, in this case, the antenna system 3 transmits an electromagnetic wave. The antenna system 3 can also receive an electromagnetic wave. A process of receiving the electromagnetic wave is opposite to the foregoing process.

Optionally, the first cable 250 can be electrically connected to the OBU 5 in a pluggable manner via a connector. Thus, it can be understood that the antenna assembly 6 and the OBU 5 can be produced separately, which is beneficial to reducing production and processing difficulty and improving production efficiency. Furthermore, the first cable 250 can be mounted to be connected to the OBU 5 only when the vehicle body 2 needs to use the antenna system 3, thereby avoiding break of a connection between the first cable 250 and the OBU 5 due to external factors during transportation, selling, and the like.

The antenna assembly 6 of the antenna system 3 provided in the foregoing implementations is described below in detail with reference to the accompanying drawings.

Figure 4:
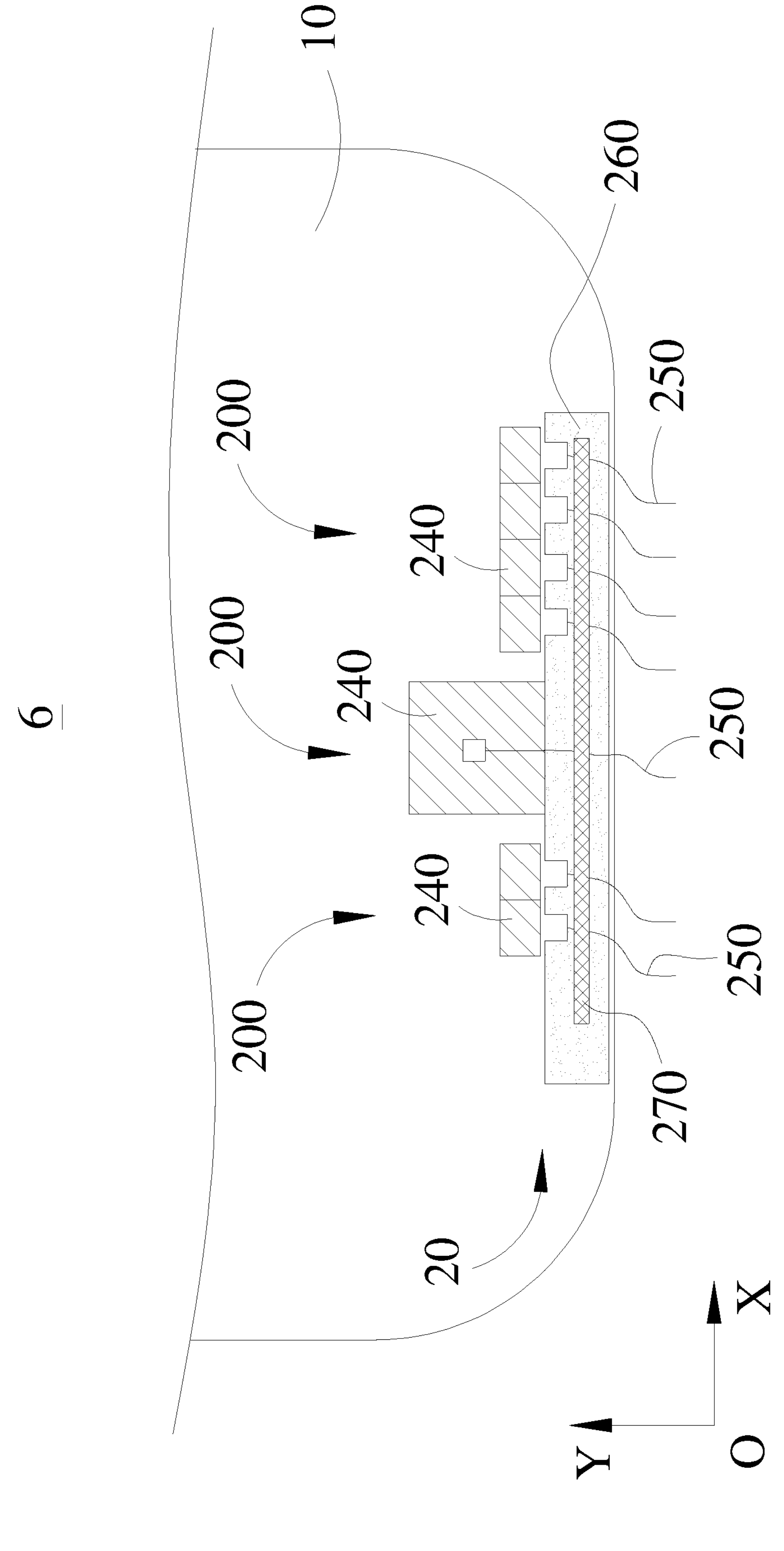
FIG. 4 is a partial schematic structural view of the antenna system illustrated in FIG. 2 in an implementation.

Referring to FIG. 4, the antenna assembly 6 is further provided in the disclosure. The antenna assembly 6 includes a sunroof 10 and an antenna combination 20. The sunroof 10 may be a glass mounted on a top of the vehicle 1. The sunroof 10 may be in a shape including, but not limited to, a square, a rectangle, a triangle, an oval, a circle, and the like. The antenna combination 20 is disposed at an end of the sunroof 10. The end of the sunroof 10 refers to a portion of the sunroof 10 adjacent to an edge of the sunroof 10. The sunroof 10 has multiple ends. The antenna combination 20 may be disposed at any one of the multiple ends of the sunroof 10. For example, a rectangular sunroof has four ends, and the antenna combination 20 may be disposed at any one of the four ends.

It needs to be noted that, for ease of illustration, a coordinate system is introduced in a view in which the antenna assembly 6 is illustrated in FIG. 4. In FIG. 4, a width direction of the sunroof 10 is defined as an X-axis direction, a length direction of the sunroof 10 is defined as a Y-axis direction (which is also a length direction or a driving direction of the vehicle 1), and a direction perpendicular to an X—O—Y plane is defined as a Z-axis direction (which is a thickness direction of the sunroof 10 as well as an irradiation direction of light).

The antenna combination 20 includes multiple antenna elements 200 operating in different frequency ranges. Term "multiple" means that the number (quantity) is greater than or equal to two, specifically, the number may be 2, 3, 5, 6, etc. The antenna element 200 may be, but is not limited to, a frequency modulation (FM)/amplitude modulation (AM) antenna, a television (TV) antenna, a telephone antenna, a navigation antenna, a Bluetooth antenna, a $5^{th}$ generation (5G) antenna, a vehicle-to-everything (V2X) antenna, etc. In the disclosure, only an example that the antenna element 200 is a navigation antenna, a 5G antenna, and a V2X antenna is taken for exemplary illustration.

The multiple antenna elements 200 are arranged along the edge of the sunroof 10, that is, the multiple antenna elements 200 are arranged in sequence in the X-axis direction in FIG. 4. In other implementations, the multiple antenna elements 200 may be arranged in sequence in the Y-axis direction in FIG. 4. It can be understood that, an extending direction of the edge of the sunroof 10 is related to the shape of the sunroof 10 itself, and a direction in which the multiple antenna elements 200 are arranged may also change accordingly. Exemplarily, in the case where the shape of the sunroof 10 is a circle, the edge of the sunroof 10 extends in an arc-shaped direction, and the multiple antenna elements 200 may be accordingly arranged in an arc-shaped direction. In the case where the shape of the sunroof 10 is a rectangle (as illustrated in FIG. 4), the edge of the sunroof 10 may extend alone a straight line, and the multiple antenna elements 200 may be arranged along the straight line accordingly.

It can be understood that, on the one hand, the antenna combination 20 is disposed on the sunroof 10, so that adverse effect on exterior design of the vehicle 1 can be avoided, and an air resistance may not be increased. On the other hand, the antenna combination 20 is disposed at the edge of the sunroof 10, which can avoid or weaken light blocking by the antenna combination 20, thereby ensuring that sufficient light can pass through the sunroof 10 and then irradiate the interior of the vehicle 1, so as to obtain better daylighting effect. On the other hand, the multiple antenna elements 200 are arranged along the edge of the sunroof 10, so that a length direction of the OBU 5 can be designed to be parallel to the direction in which the multiple antenna elements 200 are arranged. Under such arrangement, a connection area between the OBU 5 and the vehicle body 2 can be increased, thereby improving connection stability and facilitating arrangement of the first cables 250 between the OBU 5 and the multiple antenna elements 200.

Figure 5:
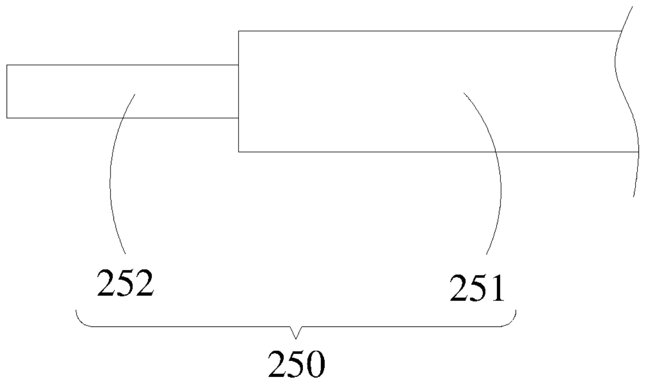
FIG. 5 is a schematic view of a first cable provided in implementations of the disclosure.

Referring to FIG. 4, the multiple antenna elements 200 include radiators 240, a ground layer 260, and first cables 250. The radiator 240 is configured to transmit/receive an electromagnetic wave. The radiator 240 may be formed on the sunroof 10 through a process including, but not limited to, silver paste printing or coating. The radiators 240 include a first radiator 211, a second radiator 221, and a third radiator 231. The three radiators 240 belong to different antenna elements 200, which will be described in the following implementations. The ground layer 260 is configured to provide a reference ground plane for the radiator 240, and the ground layer 260 may be formed on the sunroof 10 through a process including, but not limited to, silver paste printing. The first cable 250 is configured to be electrically connected to the OBU and the radiator 240. Referring to FIG. 5, the first cable 250 includes an insulation sleeve 251 and a core 252. The core 252 is wrapped in the insulation sleeve 251. The insulation sleeve 251 is connected to the ground layer 260, and the core 252 is configured to feed the radiator 240.

Referring to FIG. 4, the antenna combination 20 further includes a fixing member 270. The first cable 250 is fixed on one side of the sunroof 10 through the fixing member 270. It can be understood that, an inevitable vibration of the vehicle 1 during driving of the vehicle 1 may cause the first cable 250 to shake, and several times of shaking of the first cable 250 may eventually cause the first cable 250 to fall off from the sunroof 10. In the implementations, with the fixing member 270, the first cable 250 can be fixed on the sunroof 10 through the fixing member 270, which can prevent the first cables 250 between the fixing member 270 and the radiators 240 from excessive shaking, thereby solving the foregoing problem.

Referring to FIG. 4, there are multiple first cables 250 arranged at intervals along the edge of the sunroof 10, that is, the multiple first cables 250 are arranged in a distributed manner. It can be understood that, if the multiple first cables 250 are bound together to form a cable combination, the cable combination has relatively great inertia compared with a single first cable 250. During shaking of the cable combination, a single first cable 250 in the cable combination is subject to a relatively large pulling force, which may cause a joint of the first cable 250 to be torn off under long-term action of the relatively large pulling force. Compared with the manner of binding the multiple first cables 250 together, in the implementations, the multiple first cables 250 are arranged in the distributed manner to avoid a relatively large force of inertia, thereby overcoming the foregoing problem.

Figure 6:
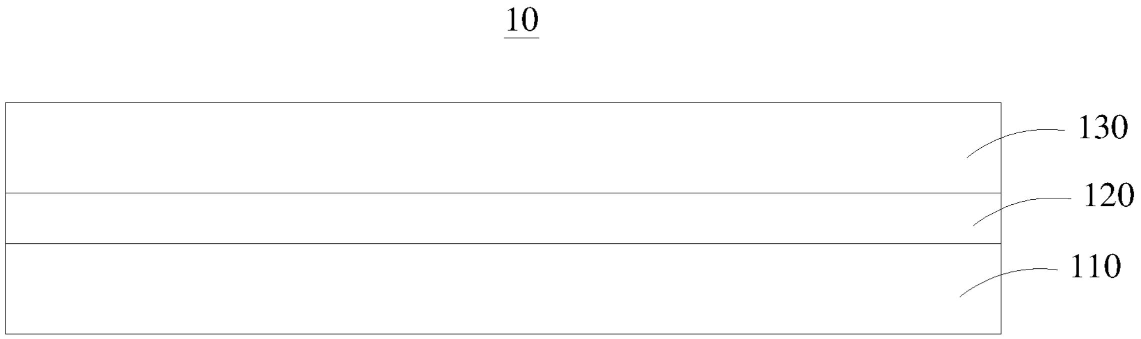
FIG. 6 is a schematic view of a sunroof provided in implementations of the disclosure.

Referring to FIG. 6, the sunroof 10 includes an inner layer 110, an intermediate layer 120, and an outer layer 130 that are stacked in sequence. The inner layer 110 is one layer of the sunroof 10 exposed inside the vehicle 1, and the inner layer 110 may be made of a material including, but not limited to, glass. The intermediate layer 120 is an interlayer material sandwiched between the inner layer 110 and the outer layer 130, and is used to bond the inner layer 110 and the outer layer 130 together. The intermediate layer 120 may be made of a material including, but not limited to, polyvinyl butyral (PVB). The outer layer 130 is one layer of the sunroof 10 exposed outside the vehicle 1, and the outer layer 130 may be made of a material including, but not limited to, glass.

Figure 7:
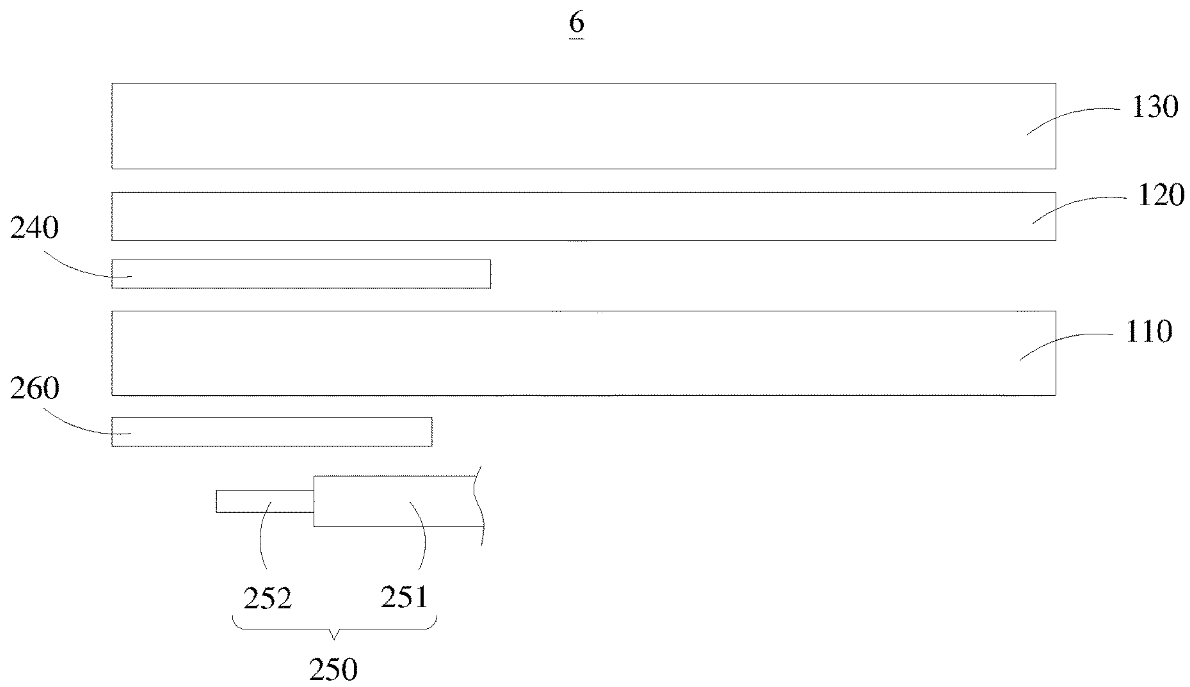
FIG. 7 is an exploded schematic structural view illustrating coupling-feeding between a first cable and a radiator provided in implementations of the disclosure.
Figure 8:
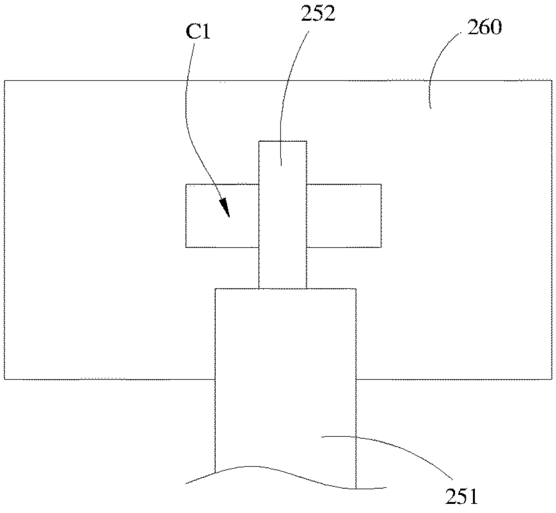
FIG. 8 is a schematic view illustrating a positional relation between the first cable and a ground layer illustrated in FIG. 7.

Referring to FIG. 7 and FIG. 8, in an implementation, the first cable 250 is coupled to and configured to feed the radiator 240. Specifically, the radiator 240 is disposed between the inner layer 110 and the outer layer 130, and the first cable 250 and the ground layer 260 each are disposed at a side of the inner layer 110 away from the radiator 240. The ground layer 260 defines a gap C1. An orthographic projection of the first cable 250 on the ground layer 260 at least partially falls within the gap C1. That is, the orthographic projection of the first cable 250 on the ground layer 260 intersects the gap C1, so that the first cable 250 is coupled to and configured to feed the radiator 240 through the gap C1 on the ground layer 260. The gap C1 may be in a shape including, but not limited to, a square, a rectangle, a circle, etc., where the shape and size of the gap C1 are not limited herein. It can be understood that, coupling-feeding may widen a bandwidth of the antenna element 200, that is, increase a frequency range of an effective operation of the antenna element 200.

It needs to be noted that the radiator 240 may be disposed between the inner layer 110 and the intermediate layer 120. For example, the radiator 240 may be formed on a surface of the inner layer 110 close to the outer layer 130 through silver paste printing or coating. The radiator 240 may also be disposed between the outer layer 130 and the intermediate layer 120. In implementations of the disclosure, only an example that the radiator 240 is disposed between the inner layer 110 and the intermediate layer 120 is taken for exemplary illustration. It can be understood that, on the one hand, the radiator 240 being disposed between the inner layer 110 and the outer layer 130 can realize conformal antennas without affecting the structure of the sunroof 10, on the other hand, the radiator 240 being disposed between the inner layer 110 and the outer layer 130 can prevent the radiator 240 from external interference and break, thereby facilitating the antenna combination 20 to stably realize a corresponding function.

Figure 9:
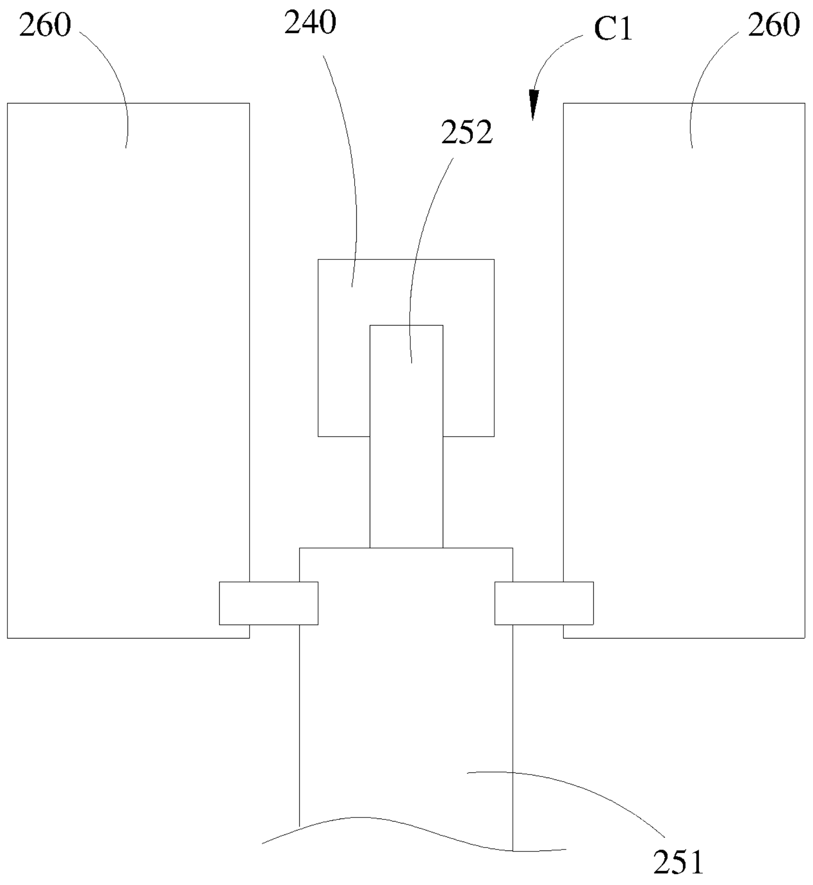
FIG. 9 is a schematic view illustrating directly connecting and feeding between a first cable and a radiator provided in implementations of the disclosure.

Referring to FIG. 9, in another implementation, the radiator 240 and the ground layer 260 are disposed on a same side of the sunroof 10, and the first cable 250 is directly connected to and configured to feed the radiator 240. Exemplarily, the radiator 240 and the ground layer 260 each are disposed on a surface of the inner layer 110 away from the outer layer 130. The ground layer 260 defines the gap C1, the radiator 240 is received in the gap C1, the first cable 250 may be connected to the radiator 240 through a process including, but not limited to, welding, and such a structure may be referred to as a coplanar waveguide structure. It can be understood that, the radiator 240 and the ground layer 260 each are disposed on the surface of the inner layer 110 away from the outer layer 130, which avoids a problem in the above coupling-feeding that two opposite sides of the inner layer 110 need to be separately processed, thereby improving processing efficiency, moreover, also avoids a problem that the radiator 240 may be damaged by being pulled or pressed by the intermediate layer 120.

Figure 10:
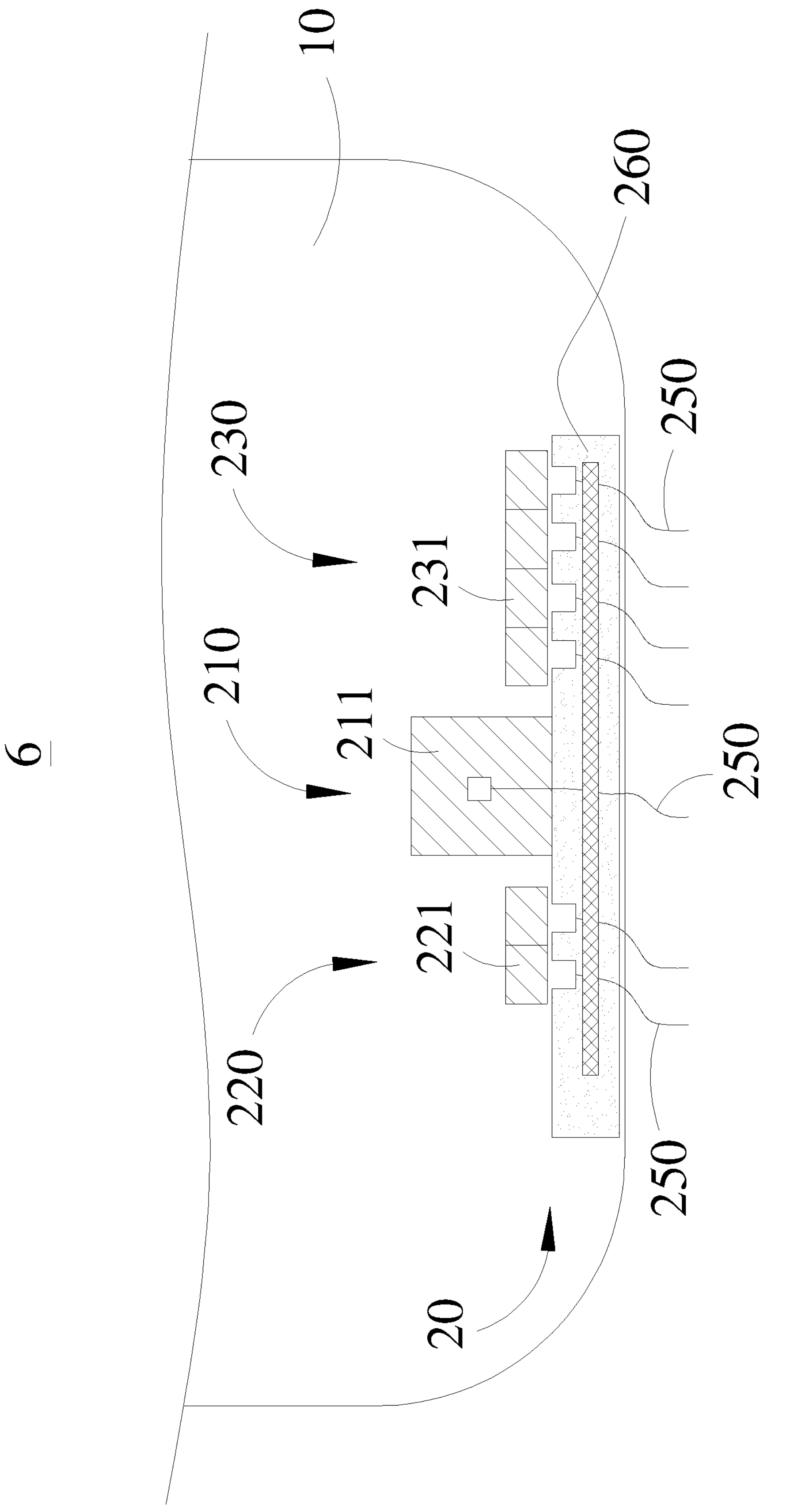
FIG. 10 is a partial schematic structural view of the antenna system illustrated in FIG. 2 in another implementation.

Referring to FIG. 10, the multiple antenna elements 200 include a first antenna element 210, a second antenna element 220, and a third antenna element 230, where each element will be described in detail below with reference to the accompanying drawings.

The first antenna element 210 is a navigation antenna element, where the navigation antenna element can receive positioning information to determine a current position of the vehicle 1. The first antenna element 210 includes a first radiator 211 and a first cable 250. The OBU 5 is electrically connected to the first radiator 211 via the first cable 250. The first cable 250 is coupled to and configured to feed the first radiator 211, or the first cable 250 is directly connected to and configured to feed the first radiator 211 (for details, reference can be made to the foregoing implementations).

Optionally, a geometric center of the first radiator 211 is located at a central axis of the sunroof 10. It can be understood that the sunroof 10 is also generally disposed at the central axis of the vehicle 1, that is to say, the geometric center of the first radiator 211 is located at or approximately located at the central axis of the vehicle 1. Since the first antenna element 210 is a navigation antenna element, the positioning information of the vehicle 1 is based on a position of the first antenna element 210, and thus the first radiator 211 disposed at the central axis of the sunroof 10 can make the positioning of the vehicle 1 more accurate. To explain from the opposite perspective, if the first antenna element 210 is not disposed at the central axis of the vehicle 1, during a U-turn in place, a positioning point of the vehicle 1 before the U-turn is located at one side of the central axis of the vehicle 1, while a positioning point of the vehicle 1 after the U-turn is located at the other side of the central axis of the vehicle 1. That is to say, at the same location and different orientations, there will be deviations in the positioning results of the vehicle 1.

Referring to FIG. 10, the multiple antenna elements 200 further include a second antenna element 220 disposed at a side of the first antenna element 210. The second antenna element 220 includes multiple second radiators 221 and multiple first cables 250. Term "multiple" means that the number is greater than or equal to two, and the number of second radiators 221 is equal to the number of first cables 250. For example, there are only two second radiators 221 and two first cables 250 in the disclosure. The OBU 5 is electrically connected to the second radiator 221 via the first cable 250. The first cable 250 is coupled to and configured to feed the second radiator 221, or the first cable 250 is directly connected to and configured to feed the second radiator 221 (for details, reference can be made to the foregoing implementations).

Furthermore, the multiple second radiators 221 and the multiple first cables 250 are all arranged along the edge of the sunroof 10, and different first cables 250 are connected to different second radiators 221. In other words, the multiple second radiators 221 are arranged along the edge of the sunroof 10, the multiple first cables 250 are arranged along the edge of the sunroof 10, and the first cables 250 are in one-to-one correspondence with and are connected to the second radiators 221.

Furthermore, the second antenna element 220 may be, but is not limited to, a V2X antenna element, where V2X refers to vehicle-to-everything. V2X may include, but is not limited to, vehicle-to-network (V2N), vehicle-to-vehicle (V2V), vehicle-to-infrastructure (V2I), and vehicle-to-pedestrian (V2P). V2N is an internet of vehicle communication, which can enable the vehicle 1 to be connected to a cloud server through a mobile network, thereby implementing application functions such as navigation, entertainment, and theft prevention. V2V can be used for realize information communication between vehicles 1. V2I can make vehicle 1 to realize data exchange with infrastructures of roads and roadsides, for example, to obtain traffic light information and various road sign information. V2P is mainly used for realizing functions of guaranteeing safety of pedestrians and non-automobiles.

Referring to FIG. 10, the multiple antenna elements 200 further include a third antenna element 230 disposed at a side of the navigation antenna element away from the second antenna element 220. The third antenna element 230 includes multiple third radiators 231 and multiple first cables 250. Term "multiple" means that the number is greater than or equal to two, and the number of third radiators 231 is equal to the number of first cables 250. For example, there are only four third radiators 231 and four first cables 250 in the disclosure. Optionally, the third antenna element 230 is a 5G antenna element. The OBU 5 is electrically connected to the third radiator 231 via the first cable 250. The first cable 250 is coupled to and configured to feed the third radiator 231, or the first cable 250 is directly connected to and configured to feed the third radiator 231 (for details, reference can be made to the foregoing implementations).

Furthermore, the multiple third radiators 231 and the multiple first cables 250 are all arranged along the edge of the sunroof 10, and different first cables 250 are connected to different third radiators 231. In other words, the multiple third radiators 231 are arranged along the edge of the sunroof 10, the multiple first cables 250 are arranged along the edge of the sunroof 10, and the first cables 250 are in one-to-one correspondence with and are connected to the third radiators 231.

It should be noted that, the sunroof 10 may be fully transparent, semi-transparent, or opaque, and a transmittance of the sunroof 10 may be a constant value or a variable value (for example, the sunroof 10 may be electrochromic glass or photochromic glass).

Figure 11:
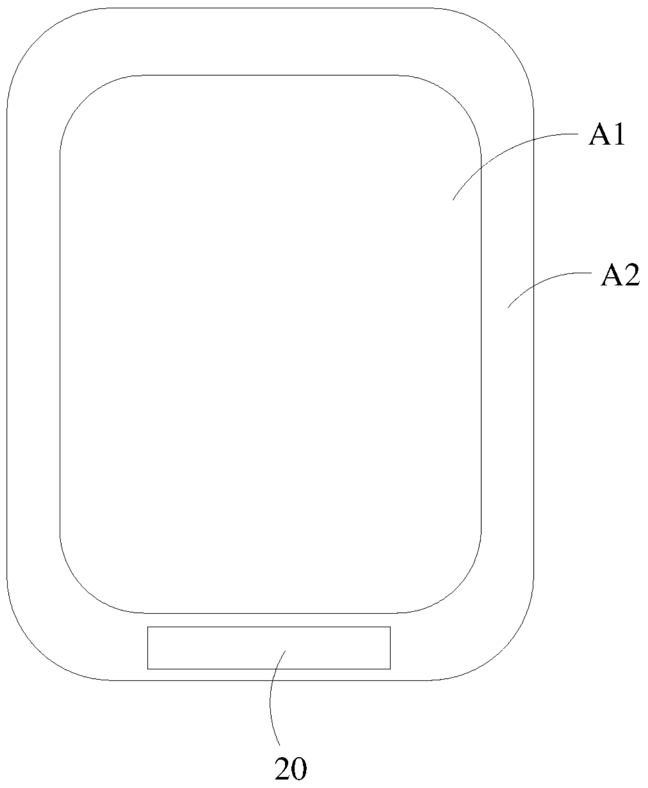
FIG. 11 is a schematic view of a sunroof having a first region and a second region provided in implementations of the disclosure.

Referring to FIG. 11, optionally, the sunroof 10 includes a first region A1 and a second region A2 connected to the first region A1. The first region A1 is a light-transmitting region, i.e., light can pass through the first region A1 and enter the interior of the vehicle 1. The second region A2 is connected to and surrounds the first region A1, serves as a black side, and is non-transparent or less transparent compared to the first region A1. Furthermore, optionally, the antenna combination 20 is at least partially disposed in the second region A2, and thus the antenna combination 20 can be hidden in the black-side region, enhancing aesthetic appeal of the sunroof 10 without blocking light from entering the interior of the vehicle 1.

Although implementations of the disclosure have been illustrated and described, it can be understood that the above implementations are exemplary rather than limit to the disclosure, and various changes, modifications, replacements, and variations can be made to these implementations by those skilled in the art, and these improvements and embellishments are also considered the scope of protection of the disclosure.

What is claimed is:

1. An antenna assembly, applicable to a vehicle and comprising a sunroof and an antenna combination, wherein the antenna combination is disposed at an end of the sunroof, and the antenna combination comprises a plurality of antenna elements arranged along an edge of the sunroof;

the plurality of antenna elements comprise radiators and first cables, and the sunroof comprises an inner layer, an intermediate layer, and an outer layer that are stacked in sequence, wherein the radiators are disposed between the inner layer and the outer layer, and the first cables are disposed at a side of the inner layer away from the radiators; and the plurality of antenna elements further comprise a ground layer disposed at a side of the inner layer away from the outer layer, wherein the ground layer defines a gap thereon, orthographic projections of the first cables on the ground layer at least partially fall within the gap, and the first cables are coupled to and configured to feed the radiators through the gap on the ground layer.

2. The antenna assembly of claim 1, wherein the plurality of antenna elements comprise a first antenna element, wherein the first antenna element is a navigation antenna element and comprises a first radiator disposed at a central axis of the sunroof.

3. The antenna assembly of claim 2, wherein the plurality of antenna elements further comprise a second antenna element, wherein the second antenna element comprises a plurality of second radiators arranged along the edge of the sunroof.

4. The antenna assembly of claim 3, wherein the plurality of antenna elements further comprise a third antenna element, wherein the third antenna element comprises a plurality of third radiators arranged along the edge of the sunroof.

5. The antenna assembly of claim 1, wherein the antenna combination further comprises a fixing member, the first cables are electrically connected to the radiators, and the first cables are fixed on the sunroof through the fixing member.

6. The antenna assembly of claim 5, wherein a plurality of first cables are arranged at intervals along the edge of the sunroof.

7. An antenna system, comprising an on-board unit (OBU) and an antenna assembly, first cables of the antenna assembly being electrically connected to the OBU, wherein the antenna assembly is applicable to a vehicle and comprises a sunroof and an antenna combination, the antenna combination is disposed at an end of the sunroof, and the antenna combination comprises a plurality of antenna elements arranged along an edge of the sunroof; and the plurality of antenna elements comprise radiators, a ground layer, and first cables, wherein the radiators and the ground layer are disposed at a same side of the sunroof, the ground layer defines a gap, the radiators are received within the gap, and the first cables are directly connected to and configured to feed the radiators.

8. The antenna system of claim 7, wherein the plurality of antenna elements comprise a first antenna element, wherein the first antenna element is a navigation antenna element and comprises a first radiator disposed at a central axis of the sunroof.

9. The antenna system of claim 8, wherein the plurality of antenna elements further comprise a second antenna element, wherein the second antenna element comprises a plurality of second radiators arranged along the edge of the sunroof.

10. The antenna system of claim 9, wherein the plurality of antenna elements further comprise a third antenna element, wherein the third antenna element comprises a plurality of third radiators arranged along the edge of the sunroof.

11. The antenna system of claim 7, wherein the antenna combination further comprises a fixing member, the first cables are electrically connected to the radiators, and the first cables are fixed on the sunroof through the fixing member.

12. The antenna system of claim 11, wherein a plurality of first cables are arranged at intervals along the edge of the sunroof.

13. A vehicle, comprising a vehicle body and an antenna system, wherein the antenna system is mounted on the vehicle body, and an on-board unit (OBU) of the antenna system is electrically connected to the vehicle body through a second cable, wherein the antenna assembly is applicable to a vehicle and comprises a sunroof and an antenna combination, the antenna combination is disposed at an end of the sunroof, and the antenna combination comprises a plurality of antenna elements arranged along an edge of the sunroof; and the plurality of antenna elements comprise radiators and first cables, and the sunroof comprises an inner layer, an intermediate layer, and an outer layer that are stacked in sequence, wherein the radiators are disposed between the inner layer and the outer layer, and the first cables are disposed at a side of the inner layer away from the radiators; and the plurality of antenna elements further comprise a ground layer disposed at a side of the inner layer away from the outer layer, wherein the ground layer defines a gap thereon, orthographic projections of the first cables on the ground layer at least partially fall within the gap, and the first cables are coupled to and configured to feed the radiators through the gap on the ground layer.

14. The vehicle of claim 13, wherein the plurality of antenna elements comprise a first antenna element, wherein the first antenna element is a navigation antenna element and comprises a first radiator disposed at a central axis of the sunroof.

15. The antenna assembly of claim 1, wherein for each of the first cables, the first cable is operable to be electrically connected to an on-board unit (OBU) of an antenna system of the vehicle, wherein the OBU is configured for signal transmission and reception, and a radio-frequency (RF) signal generated by the OBU is transmitted to the antenna assembly through the first cable to excite the antenna assembly to generate an electromagnetic wave and radiate an electromagnetic wave to a surrounding space.

16. The antenna assembly of claim 1, wherein for each of the first cables, the first cable comprises an insulation sleeve and a core, the core is wrapped in the insulation sleeve, the insulation sleeve is connected to the ground layer, and the core is configured to feed a corresponding one of the radiators.

17. The antenna assembly of claim 1, wherein the sunroof comprises a first region and a second region, the second region is connected to and surrounds the first region, the first region is a light-transmitting region, the second region is non-transparent and serves as a black-side region, and the antenna combination is disposed in the second region such that the antenna combination is hidden in the black-side region.

18. The antenna system of claim 7, wherein the antenna system is configured to transmit/receive an electromagnetic wave; and for each of the first cables, the first cable comprises an insulation sleeve and a core, the core is wrapped in the insulation sleeve, the insulation sleeve is connected to the ground layer, and the core is configured to feed a corresponding one of the radiators.

19. The antenna system of claim 7, wherein the sunroof comprises a first region and a second region, the second region is connected to and surrounds the first region, the first region is a light-transmitting region, the second region is non-transparent and serves as a black-side region, and the antenna combination is disposed in the second region such that the antenna combination is hidden in the black-side region.

20. The antenna system of claim 7, wherein the sunroof comprises an inner layer, an intermediate layer, and an outer layer that are stacked in sequence; and the ground layer is configured to provide a reference ground plane for the radiators, wherein the radiators and the ground layer each are disposed on a surface of the inner layer away from the outer layer, and the ground layer defines a gap, and the radiators are received within the gap.

* * * * *